Jan. 17, 1933. T. B. FLANAGAN 1,894,442
WEIGHING SCALE
Filed Sept. 14, 1927
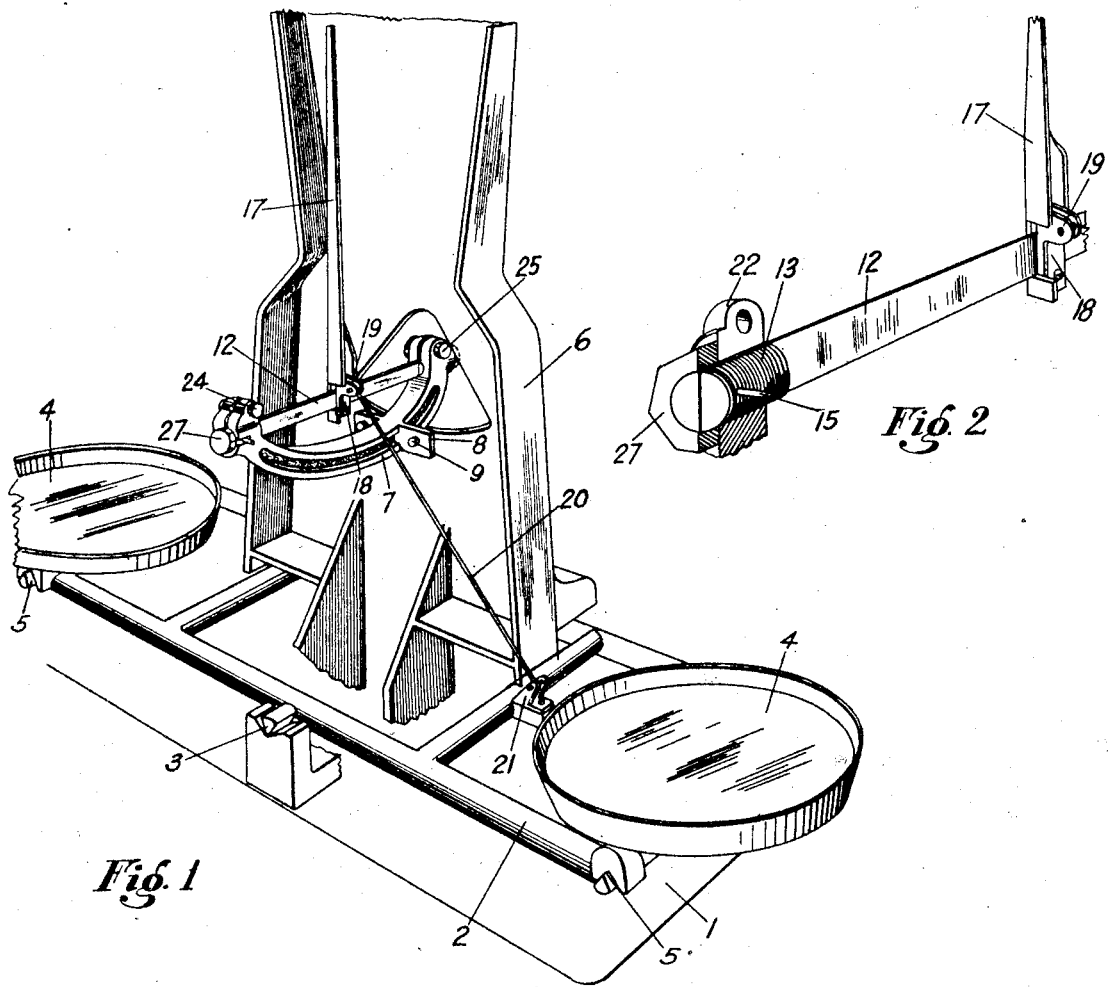
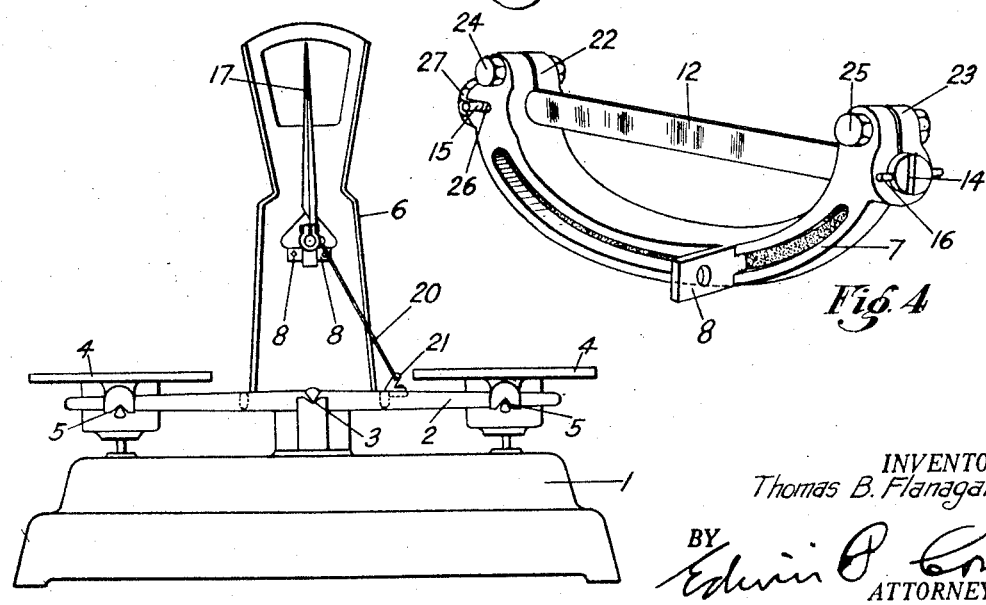
INVENTOR.
Thomas B. Flanagan Patented Jan. 17, 1933

1,894,442

UNITED STATES PATENT OFFICE

THOMAS B. FLANAGAN, OF COLUMBUS, OHIO, ASSIGNOR TO THE EXACT WEIGHT SCALE COMPANY, OF COLUMBUS, OHIO, A CORPORATION OF OHIO

WEIGHING SCALE

Application filed September 14, 1927. Serial No. 219,541.

My invention relates to weighing scales and, more particularly, to weighing scales having a torsion element embodied in the mechanical parts thereof.

This invention is particularly adaptable to scales of the over and under-weight indicating type, or in scales wherein the movement of the scale beam in either direction is shown by an indicator, and wherein a torsion element is employed as a means for offering sufficient resistance to cause the movements of the indicator over a relatively short distance to be in exact proportion to the movements of the scale beam.

Various degrees of resistance are required in the torsion elements for different scales and for scales that are used for different purposes. It is a known fact that it is possible to vary the resistance of the torsion elements by substituting elements of greater or lesser thicknesses or by substituting elements that differ in composition. Such method of varying the degree of resistance is prohibitive due to the amount of time, labor and material used.

Also, previously used torsion scales have had the decided disadvantage of requiring absolute familiarity with the working parts of the scale to enable a workman to substitute one torsion element for another. In fact, absolute familiarity with the working parts of scales of this type has been essential in substituting or repairing any of the working parts of such scale.

One of the objects of my invention is to provide a scale wherein the movement of the beam is transmitted to the indicator by the use of a minimum number of parts and with a consequent minimizing of the friction resulting as well as with a consequent decrease in the cost and increase in the efficiency of the scale.

Another object of my invention is to provide a resilient means for predetermining the position of the indicator together with a simple means for adjusting such resilient means to properly position this indicator and to properly regulate the resistance of the movement of the indicator from its predetermined position.

One feature of my invention arises from the provision of a direct push and pull rod connection between the beam of the scale and the indicator, so that the movement of the beam is directly transmitted to the indicator by a thrusting motion substantially along the axis of the push and pull rod.

Another feature of my invention consists in the provision of a resilient element, preferably of torsion form, wherein the tension of the element may be readily regulated and adjusted.

Another feature of my invention is to provide a scale structure wherein a torsion element is utilized for positioning the indicator in a predetermined position, while a means is provided for twisting the torsion element to various positions of adjustment to regulate the position of the indicator and to regulate the resistance of movement of the indicator.

Other objects and features of my invention may be seen in the following detailed description and the preferred embodiment of my invention may be seen in the accompanying drawing wherein similar characters of reference designate corresponding parts and wherein:

Figure 1 is a perspective view of a scale embodying the novel features of my invention.

Figure 2 is a perspective view of the torsion element with an indicator mounted thereon and showing the means for securing one end of the torsion element in its support.

Figure 3 is a front view of the scale shown in Figure 1.

Figure 4 is a perspective view of the support for the torsion element with a torsion element mounted therein.

With reference to the drawing, particularly to Figures 1 and 3, I have shown the preferred embodiment of my invention as comprising a scale having a base 1. This base may be of any preferred form and constructed in any preferred manner. A beam 2 is pivotally supported on the base 1 by means of a knife edge structure 3. Although I have shown the scale as embodying an even balance beam, it will be apparent that other types of beams may be used, with equally successful results, if desired.

Weight pans 4 are mounted upon the opposing ends of the beam 2 and are preferably supported on this beam by knife edge structures similar to the knife edge structure 3. The knife edge structures 5 are so disposed with relation to the knife edge structure 3 that a straight horizontal line drawn through these knife edge structures would pass through substantially similar parts of all of the structures.

The frame 6 extends upwardly from the base 1 and provides a means for supporting the torsion element independently of the beam 2. A torsion element support 7 may be rigidly attached to the frame 6 by means of the plates 8 which form an integral part of the support 7 and are bolted to the frame by the bolts 9. Mounted in the support 7 is the torsion element 12 which preferably consists of a flat strip of flexible material with cylindrical portions 13 and 14 on opposite ends thereof. The cylindrical portion 13 is externally threaded as shown in Figure 2 and a pin 15 extends diametrically therethrough and projects from opposing sides thereof. A pin 16 extends diametrically through the cylindrical portion 14 and the external surface of the cylindrical portion 14 is preferably smooth for a reason hereinafter described.

An indicator or pointer 17 is mounted on the torsion element 12, as shown in Figures 1, 2 and 3. Such indicator or pointer 17 is preferably mounted in the manner shown in these figures. This torsion element 12 extends through a slot, one wall, and the top and the bottom of this slot are formed by the pointer or indicator and the other wall of this slot is formed by the fastening device 18. The fastening device 18 may be secured to the pointer or indicator in any preferred manner, as by means of screw bolts or the like.

Spaced lugs 19 form an integral part of the fastening device 18 and extend laterally outward therefrom. Such lugs 19 provide a means for pivotally securing a rigid connecting rod 20 to the indicator 17. A fastening device 21, that is similar to the fastening device 18, provides a means for pivotally securing the opposite end of the rigid connecting rod 20 to a cross piece on a scale beam 2, as shown in Figures 1 and 3.

The support 7 that is adapted to hold the torsion element 12 in its desired position is so designed as to embody means for adjusting the torsion element in various ways to obtain varying resistances and also to obtain the greatest amount of efficiency therefrom.

Such torsion element support is preferably constructed in the manner shown in Figures 1 and 4. In these figures the torsion element support 7 consists of a curved body portion having its ends so constructed as to form split collars 22 and 23. Bolts 24 and 25 provide a means for tightening or loosening the split collars 22 and 23 about the circular portions 13 and 14 of the torsion element 12.

In the assembling and adjustment of this device, the bolts 24 and 25 are loosened sufficiently to permit the circular portions 13 and 14 to pass through the split collars 22 and 23. The pins 15 and 16 are then inserted into the circular portions 13 and 14, such pins being long enough to extend outwardly from the circular portion and engage the outer surface of the split collars. The pin 16 merely rests against the outer surface of the split collar 23 but a groove 26 is provided, in the split collar 22, in which the pin 15 rests to prevent turning of the torsion element 12 about its longitudinal axis.

In adjusting the tension of this torsion element, a nut 27 is screwed onto the threaded cylindrical portion 13 until the inner surface of the nut 27 contacts with the outer surface of the split collar 22. Then the nut 27 is rotated to regulate the tension of the torsion element 12 to the required degree, the pin 15 resting in the slot 26 and preventing rotation of the torsion element. When the torsion element 12 has been thus properly tensioned, the bolt 24 is tightened to draw the split collar 22 into such relation with the cylindrical portion 13 that the tension will be maintained.

After the tensional adjustment of the torsion element 12 has been completed, the torsion element is adjusted to the position at which the greatest amount of efficiency will be obtained and to the point at which the indicator mounted thereon will move equal distances in either direction from a zero position, in response to weights placed on the beam. This adjustment is accomplished by turning the circular portion 14 about its horizontal axis, either manually or otherwise, until the desired position has been reached. Movement of the indicator in response to a weight placed on first one end of the beam and then the other will determine this position. The bolt 25 in the split collar 23 is then tightened to hold the torsion element in such position of adjustment.

By referring to the drawing and the preceding description, it will be apparent that I have provided a scale having the novel feature of a torsion element support embodying means for adjusting the torsion element contained thereby to any desired tension and consequent resistance and also means for rotatably adjusting one end of the torsion element and preventing rotation of this end when properly adjusted.

A novel feature of the tension adjustment for increasing or decreasing the resistance of the torsion element forming an integral part of the torsion element support, resides in the fact that the torsion element may be readily and positively adjusted so that the relatively short movement of the indicator will be in exact proportion to the movement of the scale beam. Also, the means for rotatably adjusting one end of the torsion element provides a means for adjusting the pointer or indicator so that it will move exactly equal distances in both directions from a zero position in response to upward and downward movement of one side of the scale beam.

Another important feature of my invention resides in the fact that I have provided a rigid connecting element between the scale beam and the torsion element. With such construction it will be apparent that any movement of the scale beam will be positively communicated to the torsion element and the movement of the torsion element will be in exact proportion to the movement of the scale beam. Provision of a rigid connecting element positively eliminates any loss of movement due to friction and a rigid connecting element such as I have provided will obviate the necessity of frequent adjustment of the torsion element due to wear or strain on the connecting link.

It will be clear that I have provided a scale in which the level of the entire scale will in no way affect the accuracy of the measurements or the proper adjustment of the scale parts. This results from the fact that I have used an evenly balanced beam and an evenly balanced beam is in equilibrium, regardless of the angularity of the entire scale and the resulting angularity of the beam. Furthermore, the torsion element will tend to create the same effect as a pendulum.

By referring to the drawing and the preceding description, it will be clear that I have provided a scale embodying a torsion element which is easily adjustable and is simple in construction. Also, it will be apparent that the scale as I have constructed it is practically fool-proof and a scale wherein the torsion element is adjustable to obtain a wide range of varying resistances.

To those familiar with the art, it will be apparent that, by a slight rearrangement of the various parts, it would be possible to have the torsion element in any desired position with respect to the beam of the scale so long as the torsion element and the beam are in parallel planes. For instance, it might be desirable to have the torsion element parallel to the beam. Such minor changes could easily be made without departing from the spirit of my invention.

Having thus described my invention, what I claim is:

1. Scale structure comprising a beam, an indicator, a resilient member cooperating with said indicator and normally tending to maintain it in predetermined position, a crank for bending said resilient member, and a thrust rod between the beam and said crank to operate said crank to bend said resilient member and move said indicator in response to movement of said beam.

2. Scale structure comprising a beam, an indicator, a resilient member cooperating with said indicator normally tending to maintain it in predetermined position, a crank for bending said resilient member, and a thrust rod pivotally connected to said crank at one end and to said beam at its other end to operate said crank to bend said resilient member and move said indicator in response to movement of said beam.

3. Scale structure comprising a beam, an indicator, a resilient member cooperating with said indicator normally tending to maintain it in predetermined position, a crank for bending said resilient member, and an inclined thrust rod pivotally connected to said crank at one end and to said beam at its other end to operate said crank to bend said resilient member and move said indicator in response to movement of said beam.

4. In a scale, an even-balanced beam, an indicator, means for operating said indicator from said beam, and a resilient element for maintaining said indicator in predetermined position, means permitting rotation of one end of said resilient element, and means preventing rotation of the other end of said resilient element.

5. In a scale, an even-balanced beam, an indicator, means for operating said indicator from said beam, a resilient element for maintaining said indicator in predetermined position, a support for said resilient element, and means for varying the resistance of said resilient element, said means forming a part of said support.

6. Scale structure comprising a beam, an indicator, a resilient means attached to said indicator and normally tending to maintain it in a predetermined position, and a rod so connected to said indicator and said beam that movement of said beam will exert a thrust directly on the lower end thereof substantially at the beam and that said thrust will be transmitted along the axis of said rod to said indicator.

7. Scale structure comprising a beam, an indicator, a resilient means attached to said indicator and normally tending to maintain it in predetermined position, and a single means for transmitting movement of said beam to said indicator by a push and pull operation.

8. Scale structure comprising a beam, an indicator, means attached to said indicator and normally tending to maintain it in a predetermined position, and a single means for transmitting movement of said beam to said indicator by a push and pull operation.

In testimony whereof I hereby affix my signature.

THOMAS B. FLANAGAN.